Aug. 28, 1928.　　　　　　　　　　　　　1,682,686
J. RUTHERFORD
SPELLING BLOCKS
Filed May 11, 1927　　　2 Sheets-Sheet 1
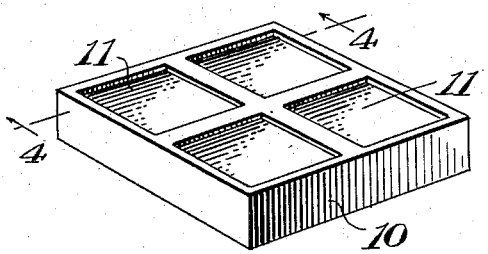
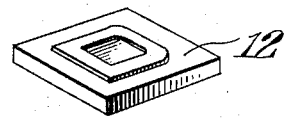
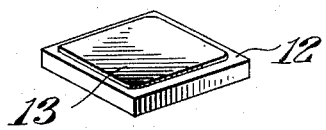
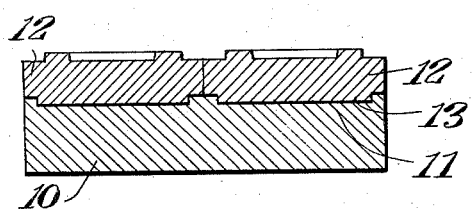
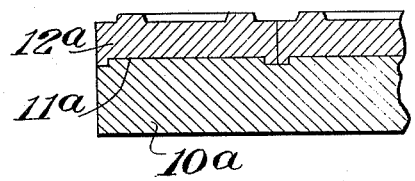
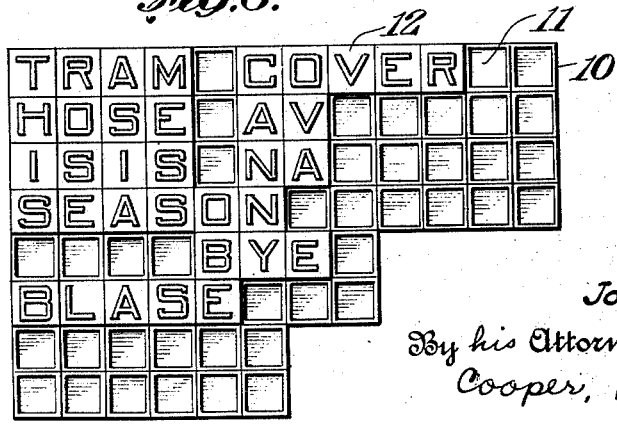
Inventor
John Rutherford.
By his Attorneys
Cooper, Kerr & Dunham Aug. 28, 1928.                                                        1,682,686
J. RUTHERFORD
SPELLING BLOCKS
Filed May 11, 1927          2 Sheets-Sheet 2

Inventor
John Rutherford.
By his Attorneys
Cooper, Kerr & Dunham

Patented Aug. 28, 1928.

1,682,686

UNITED STATES PATENT OFFICE.

JOHN RUTHERFORD, OF SLINGERLANDS, NEW YORK, ASSIGNOR TO THE EMBOSSING COMPANY, OF ALBANY, NEW YORK, A CORPORATION OF NEW YORK.

SPELLING BLOCKS.

Application filed May 11, 1927. Serial No. 190,410.

This invention relates primarily to toys of the type commonly known as spelling blocks, that is, blocks bearing letters of the alphabet, which the child can arrange to form words, and its chief object is to provide blocks of the kind stated which are not only sightly in appearance but more especially convenient in use, thereby making the blocks more attractive, encouraging their use, and enhancing their value in teaching as well as in amusing the child. To this and other ends the invention comprises the novel features hereinafter described.

My invention involves the use of what may be termed "base blocks", and "letter blocks" provided with interfitting recesses and projections so that when the latter blocks are placed on the base blocks to form words they are to a certain degree anchored or fixed in place and thus not easily disturbed or disarranged by a thoughtless movement of the small student or a playmate. The base blocks are rectangular in form, preferably square and of uniform size, with provision for four letter blocks on each base block. The base blocks can then be readily arranged side by side in accurate alignment on the table or floor, to make sentences of any desired length.

Referring to the accompanying drawing:

Fig. 1 is a perspective view showing the preferred form of base block.

Fig. 2 is a perspective view, from above, showing a letter block.

Fig. 3 is a perspective view of the bottom of one of the letter blocks.

Fig. 4 is a section on the line 4—4 of Fig. 1, showing two letter blocks positioned on the base block.

Fig. 5 is a plan view showing the blocks used for making words and sentences.

Fig. 6 is a plan view showing the blocks employed in composing a cross-word puzzle.

Fig. 7 is a section similar to Fig. 4, showing a modification.

Figure 8:
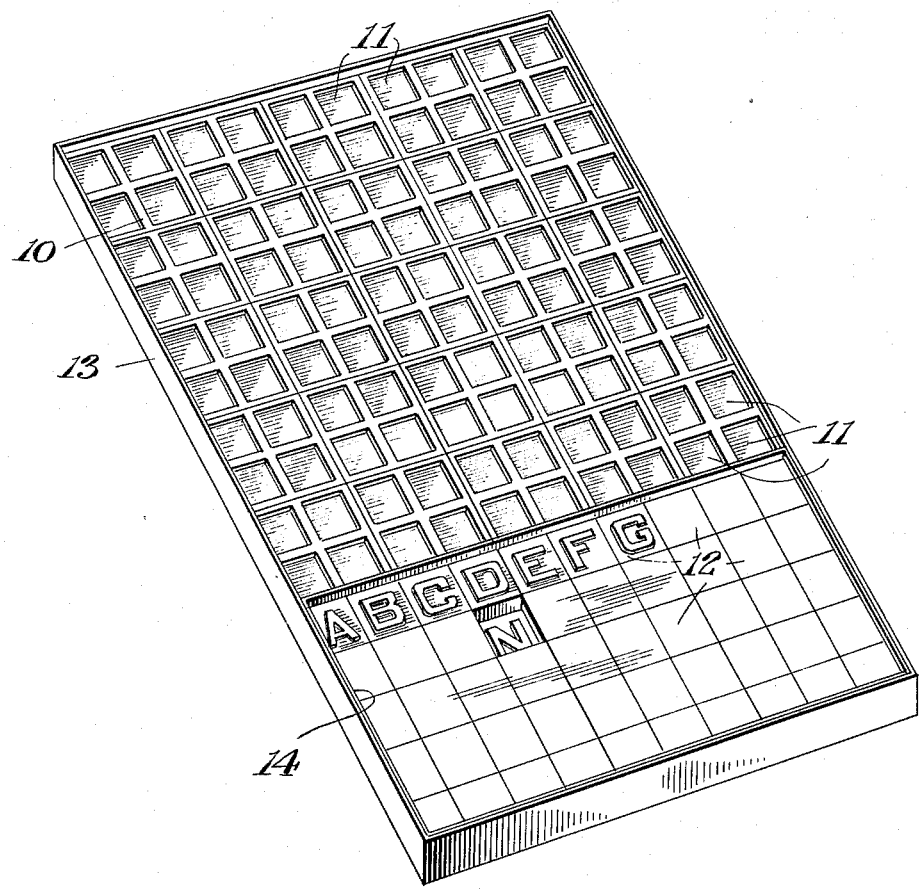
Fig. 8 is a perspective view of one of the sets or outfits.

The square base block 10, shown in Figs. 1 and 4, is preferably of wood, and may be any convenient size, as for example about two inches or fifty-one millimeters wide, and seven-sixteenths of an inch, or fifteen millimeters, thick. In the upper face are four shallow symmetrically arranged depressions 11, which may be of any suitable shape, preferably square as shown. The letter blocks, of which one is shown at 12 in Figs. 2 and 3, are the same in shape as the base blocks, and in plan are one-quarter the size of the base blocks, and say nine thirty-seconds of an inch or seven millimeters thick over all. The upper sides of the letter blocks carry letters, preferably embossed and contrastingly colored on top, as D in Fig. 2, and some may have numerals and punctuation marks. On the under side the letter blocks have low flat projections, as 13, Fig. 3, adapted in shape and size to fit smoothly, even snugly, in the depressions 11 in the base blocks, as indicated in Fig. 4. The blocks can be made by the embossing process described in the patent of Charles M. Hyatt, No. 1,322,792, issued November 25, 1919. In this process the wooden blank, cut with the grain perpendicular to the square faces, is forced down into a tubular die by means of an upper plunger die which forces the blank with great pressure upon a lower die at the bottom. The side walls of the tubular die compress the wood radially inwardly and impart a high finish to the sides of the block, and the upper and lower dies shape and impart a high finish to the faces of the block. The operation is rapid and uniform in results and has the further advantage that the powerful compression of the wood strengthens the blocks very substantially. With a rather tough wood, for example well seasoned maple, the additional strength imparted by the compression insures virtually complete freedom from breakage of even the thin letter blocks, in spite of the fact that they are made "endwise" of the grain.

In use the base blocks are arranged side by side and the selected letter blocks are fitted in place to spell words, as in Fig. 5 for example. Sentences of any desired length can be built up by adding more blocks. This capability is a source of great satisfaction and encourages the use of the blocks, and the fitting of the letter blocks in the base blocks gives the assemblage a degree of stability and freedom from easy disarrangement that has beeen found to be highly gratifying to children. The use of base blocks and letter blocks is in itself advantageous. Small, light letter blocks placed loosely on the table or floor would be disarranged by a mere touch, and large letter blocks, while less liable to such easy displacement, would cover too much space and hence would make the building up of sentences more difficult. For example, with letter blocks two inches square the third line in Fig. 5, though a very simple sentence, would require a line of blocks nearly a yard long, even with only one-inch separation between words. On the other hand, with base blocks and letter blocks the advantage of small blocks as regards space and the advantage of large blocks as regards stability of placement can be obtained with none of their disadvantages. Short sentences and long sentences can be spelled out with almost equal facility. Thus with base blocks two inches square, which is a very convenient size, the third line of Fig. 5 is only eighteen inches long, and yet the one-inch letter blocks are no more easily disturbed or moved out of alignment than two inch letter blocks placed singly on the floor would be. Indeed the shorter line would be less likely to be disarranged since the child can easily reach either end of the line without shifting his own position, which might be necessary if the line were a yard long.

Nor are the blocks devoid of utility in the hands of persons of more mature years, as they can be employed in composing cross-word puzzles. Such use is illustrated in Fig. 6.

The blocks are put up in sets or outfits, and may be packed in a shallow box containing a number of base blocks and a supply of letter blocks, the latter including several of each letter and numeral, especially the vowels and the more frequently used consonants. Such an outfit is illustrated in Fig. 8, which shows a box 13 containing twenty-five base blocks, and a hundred or more letter blocks, comprising, for example, four A's, two B's, three C's, two D's, six E's, etc., in a removable tray 14. A lid, not shown, is of course provided for the box.

In the construction shown in Fig. 7 the projection 11a is on the base block 10a and the cooperating recess is in the letter block 12a. I prefer the construction illustrated in Fig. 4, however, as it makes the base blocks rather more convenient as building blocks if the child ever wants to use them in that manner.

It is to be understood that the invention is not limited to the details herein specifically described but can be embodied in other forms without departure from its spirit.

I claim—

1. A spelling-block outfit of the kind described for use by children as a toy, comprising a plurality of base blocks rectangular in plan, each provided with aligned shallow polygonal recesses in its upper face, so that when two or more base blocks are placed side by side the recesses in the several blocks will be in alignment; and a plurality of letter blocks smaller than the base blocks, having short, flat, polygonal projections on their lower faces to fit the recesses in the base blocks when the letter blocks are assembled thereon to form words.

2. A spelling block outfit of the kind described for use by children as a toy, comprising a plurality of letter blocks, and a plurality of rectangular base blocks adapted to be arranged side by side in sequence, each base block being large enough in plan to hold a plurality of letter blocks, the base blocks and letter blocks being provided with cooperating shallow recesses and short projections to prevent lateral displacement of the letter blocks on the base blocks, said letter and base blocks being also adapted for use as building blocks.

3. A spelling-block outfit of the kind described for use by children as a toy, comprising a plurality of rectangular base blocks of uniform size and a plurality of smaller letter blocks of uniform size whereby a plurality of letter blocks may be placed on a single base block, each base block having a plurality of aligned shallow recesses in its upper face and each letter block having a short flat projection on its lower face adapted to fit into the base block recesses.

4. A spelling-block outfit of the kind described for use by children as a toy, comprising a plurality of flat base blocks square in plan and uniform in size, each provided in its upper face with four shallow recesses square in plan and of uniform size aligned vertically and horizontally, and a plurality of flat letter blocks each square in plan and of a size to permit four to be assembled on each base block, and each provided on its lower face with a short flat projection square in plan adapted to fit any recess in any base block; whereby the base blocks may be aligned in short or long horizontal rows or vertical columns or both at will and short or long words and sentences built up horizontally or vertically or both by inserting letter blocks in the base blocks, the letter blocks being held against lateral displacement relative to their respective base blocks by the interfitting recesses and projections.

In testimony whereof I hereto affix my signature.

JOHN RUTHERFORD.